US006628833B1

United States Patent
Horie

(10) Patent No.: US 6,628,833 B1
(45) Date of Patent: Sep. 30, 2003

(54) IMAGE PROCESSING APPARATUS, IMAGE PROCESSING METHOD, AND RECORDING MEDIUM WITH IMAGE PROCESSING PROGRAM TO PROCESS IMAGE ACCORDING TO INPUT IMAGE

(75) Inventor: Daisaku Horie, Uji (JP)

(73) Assignee: Minolta Co., Ltd., Osaka (JP)

( * ) Notice: Subject to any disclaimer, the term of this patent is extended or adjusted under 35 U.S.C. 154(b) by 551 days.

(21) Appl. No.: 09/599,509

(22) Filed: Jun. 23, 2000

(30) Foreign Application Priority Data

Jun. 30, 1999  (JP) .......................................... 11-185953

(51) Int. Cl.[7] .............................................. G06K 9/34
(52) U.S. Cl. ........................ 382/173; 382/272; 382/176; 382/162; 382/195; 382/199
(58) Field of Search .............................. 382/173, 195, 382/176, 199, 162, 272, 274, 286; 358/462, 464, 465

(56) References Cited

U.S. PATENT DOCUMENTS 5,768,412 A * 6/1998 Mitsuyama et al. ........ 382/173
6,167,167 A * 12/2000 Matsugu et al. ............ 382/199
6,453,069 B1 * 9/2002 Matsugu et al. ............ 382/173

FOREIGN PATENT DOCUMENTS

JP  06259550  9/1994
JP  10285396  10/1998

* cited by examiner

Primary Examiner—Phuoc Tran
(74) Attorney, Agent, or Firm—Burns, Doane, Swecker & Mathis, LLP

(57) ABSTRACT

An image processing apparatus includes a reception unit receiving image data, a region determination unit to extract a text region from the received image data, a threshold value calculation unit to calculate the background amount of the extracted text region, and an image correction unit to correct a non-text region of the image data according to the calculated background amount. Since the non-text region of the image data is corrected according to the background amount of the text region, an appropriate correction process can be applied on the image data according to difference in the paper sheet quality and image pickup condition.

13 Claims, 20 Drawing Sheets

IMAGE PROCESSING APPARATUS, IMAGE PROCESSING METHOD, AND RECORDING MEDIUM WITH IMAGE PROCESSING PROGRAM TO PROCESS IMAGE ACCORDING TO INPUT IMAGE

This application is based on Japanese Patent Application No. 11-185953 filed in Japan, the contents of which are hereby incorporated by reference.

BACKGROUND OF THE INVENTION

1. Field of the Invention

The present invention relates to an image processing apparatus, an image processing method, and a recording medium recorded with an image processing program. Particularly, the present invention relates to an image processing apparatus, an image processing method, and a recording medium recorded with an image processing program suited to improve picture quality of an image input using a digital camera or an image scanner.

2. Description of the Related Art

When a document is read using a digital camera, an image scanner, or the like, a predetermined image process is applied on the image of the document read in. A document generally includes a text region, a line copy region, a photograph region and a half tone dot region. Here, a text region refers to a rectangular region formed only of text of black characters. A line copy region refers to a rectangular region formed mainly of a single color region and an edge region such as a bar graph or a solid image. A photograph region refers to a rectangular region including many areas of varying tone. Paintings, illustrations and texture are included in the photograph region. A half tone dot region refers to a rectangular region represented by dots such as a picture in the newspaper.

It is desirable to apply a different image process and compression method on respective regions of the text, photograph, line copy and half tone dot in the case of improving the picture quality of the image or compressing the image of the document. Therefore, respective regions must be identified from the document. Edge extraction and histogram analysis are employed for this identification, using various threshold values.

As the image process applied on respective regions, a binarization process is applied on a text region whereas a subtractive color process of integrating similar colors to reduce the colors is applied on a line copy region. The subtractive color process is effective when the color that can be represented in the output device such as the printer or display is limited or when carrying out compression. An edge enhancement process, smoothing process, or tone correction process is carried out on photograph and half tone dot regions. In these image processes such as the edge enhancement process, the density gradient is compared with a threshold value for edge extraction. In the subtractive color process, the color distance is compared with a threshold value to determine similarity of the colors.

In a document obtained by a digital camera or the like, the image pickup condition such as the shooting range or illumination is not constant. The resolution, dynamic range, the background luminance and the like of the obtained document differ at every image pickup. It is therefore necessary to modify the threshold value employed in the image process applied on the document according to variation in the image pickup condition. The necessity of modifying the threshold value occurs also when the quality of the sheet of the document or the printout quality differs in addition to difference in the image pickup condition of a digital camera or the like.

An edge extraction method of determining the threshold value according to the histogram of the valley depth of the luminance, chroma saturation or RGB chromaticity is disclosed in Japanese Patent Laying-Open No. 6-259550. The threshold value is determined from the distribution of the valley depth of luminance, chroma saturation or RGB chromaticity.

An image reader apparatus that carries out a different process for each region is disclosed in Japanese Patent Laying-Open No. 10-285396. This image reader apparatus carries out the steps of extracting a text region and other regions included in the document, applying a simple binarization process on the text region with priority on the resolution, applying a dither process on a photograph region with priority on the tone, and selecting a compression method for each region.

In the edge extraction method of the aforementioned Japanese Patent Laying-Open No. 6-259550, it is difficult to determine the optimum threshold value since the distribution of luminance, chroma saturation, and RGB chromaticity varies depending upon the ratio of the characters included in the document, the contrast, and the like.

The tone or tint of the document generally varies depending upon difference in the document and the image pickup condition. If a binarization process is carried out aiming to improve the picture quality of the text region or to recognize the text, the background area of the text region will be reproduced as no-print white. There was a problem that the boundary of the background area included in a photograph region or the like adjacent to the text region will be noticeable. This problem is also seen in the case where the sheet itself is slightly colored such as the sheet of a newspaper.

The image reader apparatus disclosed in the aforementioned Japanese Patent Laying-Open No. 10-285396 is based on a contact type line sensor. The event of the background becoming darker due to insufficient lighting is not taken into account. Variation in the image pickup environment does not occur. However, there is the problem that the boundary of the background area included in a photograph region or the like is noticeable when a binarization process is applied on the text region.

SUMMARY OF THE INVENTION

In view of the foregoing, an object of the present invention is to provide an image processing apparatus, an image processing method, and a recording medium recorded with an image processing program that can carry out a region determination process and correction process appropriately according to difference in the sheet quality or image pickup condition.

According to an aspect of the present invention, an image processing apparatus includes a reception unit receiving image data, an extraction unit to extract a first region from the received image data, a calculation unit to calculate the background amount of the extracted first region, and a correction unit to correct a second region of the image data according to the calculated background amount.

According to the present invention, an image processing apparatus that can carry out an appropriate correction process according to difference in the sheet quality and image pickup condition can be provided.

According to another aspect of the present invention, an image processing method includes the steps of receiving image data, extracting a first region from the received image data, calculating the background amount of the extracted first region, and correcting a second region of the image data according to the calculated background amount.

According to the present invention, an image processing method can be provided that can carry out an appropriate correction method according to difference in the sheet quality and image pickup condition.

According to a further aspect of the present invention, a computer-readable recording medium is recorded with an image processing program for the computer to execute the steps of receiving image data, extracting a first region from the received image data, calculating the background amount of the extracted first region, and correcting a second region of the image data according to the calculated background amount.

According to the present invention, a computer-readable recording medium can be provided recorded with an image processing program that allows the computer to execute an appropriate correction process according to difference in the sheet quality and image pickup condition.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 shows the cross section density along straight line m in the line copy region when the contrast changes due to influence of the printout density or illumination level or the like.

DESCRIPTION OF THE PREFERRED EMBODIMENTS

A digital camera according to the embodiments of the present invention will be described with reference to the drawings.

First Embodiment

Figure 1:
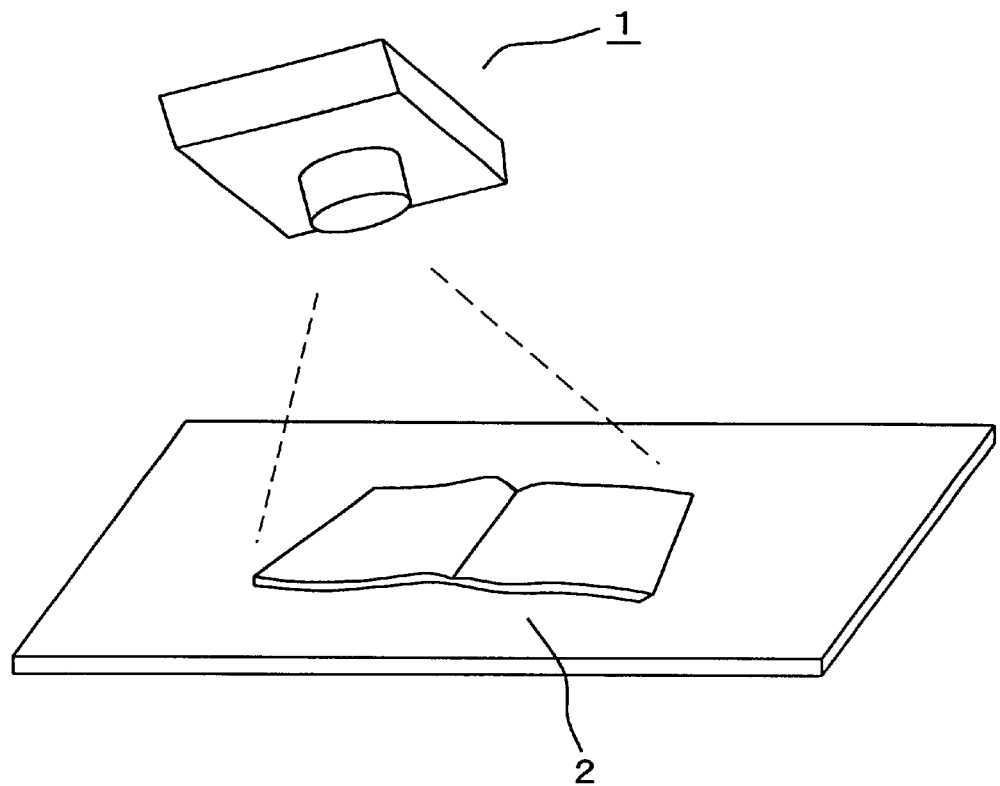
FIG. 1 shows the relationship between a digital camera and a document which is the subject of image pickup according to an embodiment of the present invention.

FIG. 1 shows the event of a digital camera 1 shooting a document 2 such as a magazine. The present embodiment is directed to improve the picture quality by dynamically altering the threshold value employed in a predetermined image process according to the image obtained by shooting document 2 with digital camera 1.

Figure 2:
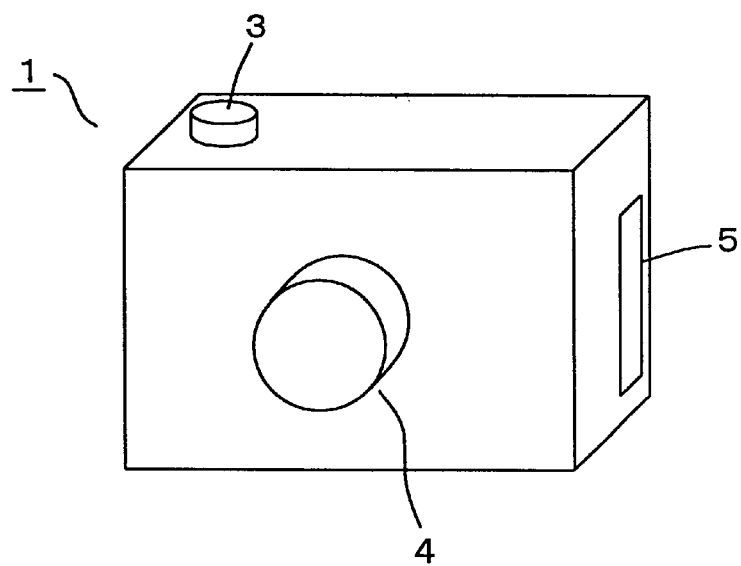
FIG. 2 is a perspective view of the digital camera viewed from the lens side.

FIG. 2 is a perspective view of digital camera 1, viewed from the lens side. Referring to FIG. 2, digital camera 1 includes a shoot bottom 3, an image pickup unit 4, and a card inlet 5.

The result shot by digital camera 1 is stored as electronic data in a hard disk card not shown, present in digital camera 1. Here, the hard disk card is a recording medium of image data. A hard disk card in conformity to PCMCIA, for example, can be employed. Alternatively, a memory card can be employed. Also, a minidisk (MD) can be employed as the recording medium. Furthermore, digital camera 1 can be directly connected to a printer or the like through an SCSI cable, for example, dispensable of a card as the recording medium.

Digital camera 1 of the present embodiment can improve the picture quality and compression rate when a document such as materials distributed at conferences or the like, catalogs, magazines, research records or the like is to be stored as electronic data.

Figure 3:
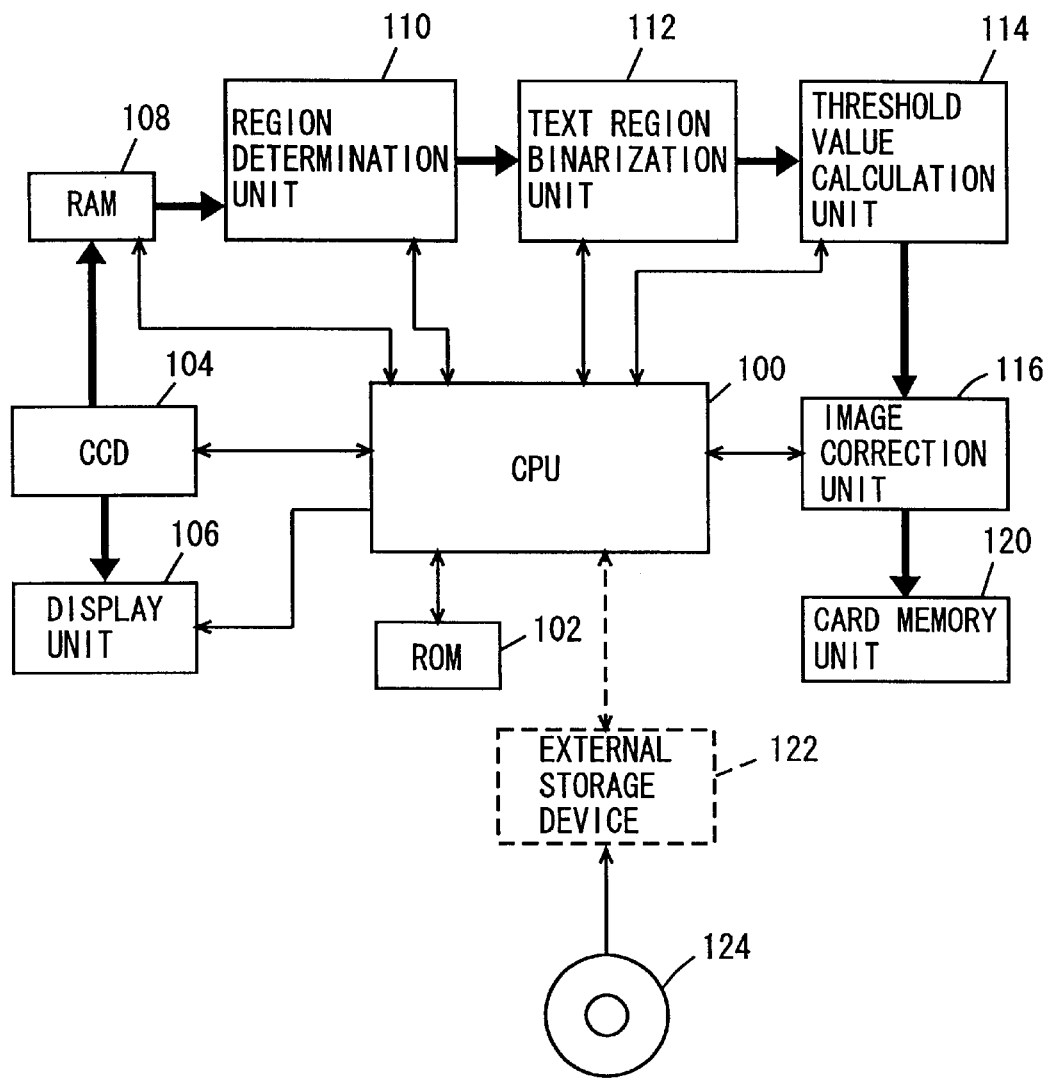
FIG. 3 is a block diagram showing a circuit structure of the digital camera according to a first embodiment of the present invention.

FIG. 3 is a block diagram showing a circuit structure of digital camera 1 according to the first embodiment of the present invention. Digital camera 1 includes a CPU 100 to provide overall control of digital camera 1, a CCD 104 to pick up an image, a display unit 106 to display the contents of image pickup, a RAM 108 for temporarily storing the image from CCD 104, a region determination unit 110 to determine a region for each image attribute from the image, a text region binarization unit 112 to binarize a text region, a threshold value calculation unit 114 to calculate a threshold value based on the pixel value of the background of the text region, an image correction unit 116 applying a predetermined image process on the document image using the obtained threshold value, a card memory unit 120 to store an image, and a ROM 102 to store a program to be executed by CPU 100.

An external storage device 122 can be provided for CPU 100 of digital camera 1 to read a program to control digital camera 1 from a CD-ROM 124, a floppy disk, or the like.

The actual manner of shooting will be described with reference to the block diagram of FIG. 3. In FIG. 3, the bold arrow represents the flow of image data whereas the thin arrow represents the flow of control data. When the user turns on the power of digital camera 1, the scene taken by pickup lens unit 4 is displayed on display unit 106 via CCD 104.

Upon sensing that shoot bottom 3 has been turned on, CPU 100 designates integration of CCD 104. When integration ends, the CCD data is dumped to RAM 108. Also, this image is provided (freeze display) on display unit 106. The image from CCD 104 is stored in RAM 108.

Following the storage of the image from CCD 104 to RAM 108, respective processes are carried out in the order of region determination unit 110, text region binarization unit 112, threshold value calculation unit 114 and image correction unit 116. Image data subjected to the image process is stored in card memory unit 125.

Each determined region is subjected to an image process and compression process suitable for respective regions. As will be described afterwards, the text region is subjected to a binarization process, and then to a compression process suitable for compression of a binary image (for example, in G4 format) to be compressed at a high compression rate. A non-text region is subjected to a subtractive color process or edge enhancement process, and then to an appropriate compression process (for example, in PNG or JPEG format). The compressed data of each region is grouped as one image file in correspondence with the relevant position information and compression format.

According to digital camera 1 of the present embodiment, an image file in high compression rate and of favorable usability is recorded as one file.

Card memory 120 may be a hard disk, an external storage device, or a terminal. The image data can be provided to a printer or a monitor. The image process described below can be carried out within digital camera 1, or carried out by another camera or terminal of a personal computer connected to digital camera 1 with data transferred thereto.

Figure 4:
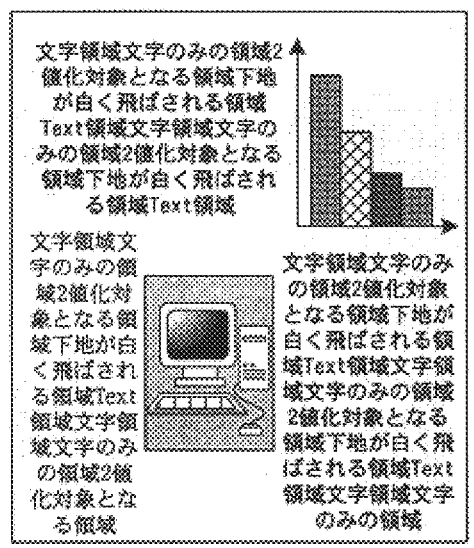
FIG. 4 shows an image of a document obtained by shooting with the digital camera.

The subtractive color process and edge enhancement process carried out at image correction unit 116 will be described hereinafter. FIG. 4 shows a document image taken through digital camera 1 and stored in RAM 108. Referring to FIG. 4, the document image includes a text region with characters, a photograph region where a photograph of a personal computer is shown, and a line copy region where a bar graph is shown. The overall background of the document is represented in gray.

Figure 5:
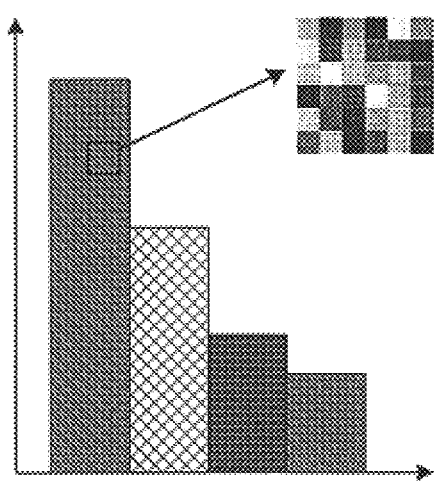
FIG. 5 is an enlargement of a line copy region located at the left upper area of the document image of FIG. 4 and a further enlargement of a part of the line copy region.
Figure 6:
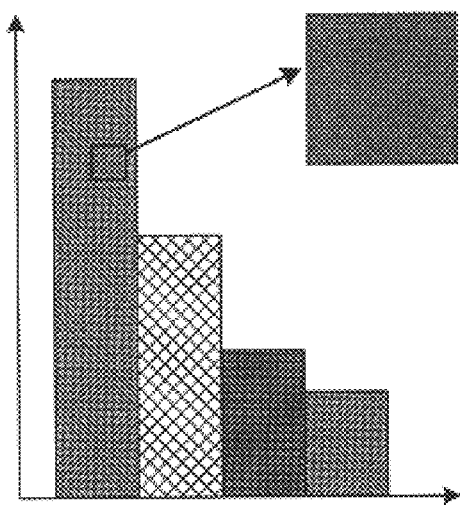
FIG. 6 is an enlargement of a line copy region of the document that is subjected to image pickup with the digital camera and a further enlargement of a part of the line copy region.

FIG. 5 shows an enlargement of the line copy region located at the right upper portion of the document image of FIG. 4, and a further enlargement of one part of the line copy region. FIG. 6 shows an enlargement of the line copy region of the document that is the object of shooting by digital camera 1 and a further enlargement of a part of the line copy region. In the bar graph of FIG. 6, each bar includes a solid region represented by a single color and a contour line enclosing the solid region. The partial enlarged view of the bar graph in FIG. 6 is represented uniformly with no unevenness in the pixel value. In the bar graph of FIG. 5, the portion which is originally a solid region has variation in the pixel value, as appreciated from the partial enlarged view of the bar graph. This arises from noise caused by influence of the performance, the image pickup environment, and the like of digital camera 1. The pixel value in the solid region may also vary due to the half tone dot in printing from the document itself that is the object of shooting with digital camera 1. The subtractive color process is carried out to eliminate this unevenness in the pixel value.

The subtractive color process is directed to improve the picture quality and compression rate. The subtractive color process is carried out by comparing the distance calculated in the color space with an optimum threshold value. If the range of the threshold value is too small, color unevenness will remain in the image subjected to the subtractive color process. If the range of the threshold value is too large, more color is reduced than needed. In this case, the region that should actually be of a different color will be represented as the same color. It is therefore necessary to use an appropriate threshold value corresponding to the print density of the document, the level of illumination during image pickup, and the like.

Figure 7:
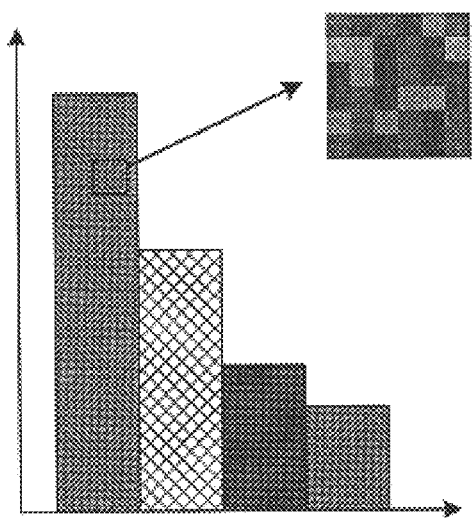
FIGS. 7 and 8 show examples of an image subjected to a subtractive color process when the range of the threshold value is too small and too large, respectively.
Figure 8:
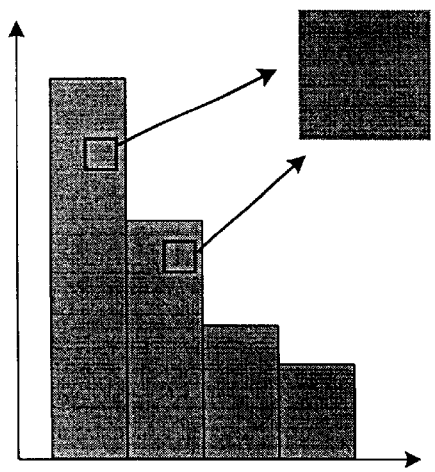

FIG. 7 shows an example of an image subjected to subtractive color process corresponding to the case where the threshold value range is too small. It is appreciated from the partial enlarged view of the bar graph of FIG. 7 that there is color unevenness. FIG. 8 shows an example of an image subjected to subtractive color process corresponding to the case where the threshold value range is too large. It is appreciated from the partial enlarged view of the solid regions of different bars in the bar graph of FIG. 8 that the different bars are represented as the same color.

Digital camera 1 of the present embodiment is directed to dynamically modify the threshold value range used in the subtractive color process according to the document image shot by digital camera 1. The threshold value is determined according to the print density of the document, the level of illumination during image pickup, and the like.

Figure 9:
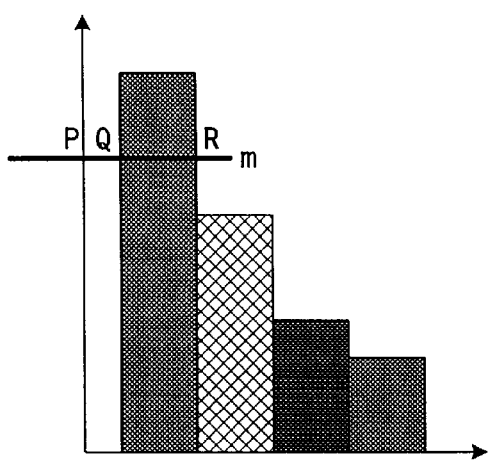
FIG. 9 shows a line copy region located at the right upper area of the document image of FIG. 4 and an arbitrary straight line m.

The edge enhancement process will be described here. FIG. 9 shows the line copy region located at the right upper area in the document image of FIG. 4 and an arbitrary straight line m. Referring to FIG. 9, straight line m traverses the Y axis of the bar graph in the line copy region and the leftmost bar. The crossing point between straight line m and the Y axis is P, and the crossing points with the edges of the leftmost bar are Q and R.

Figure 10:
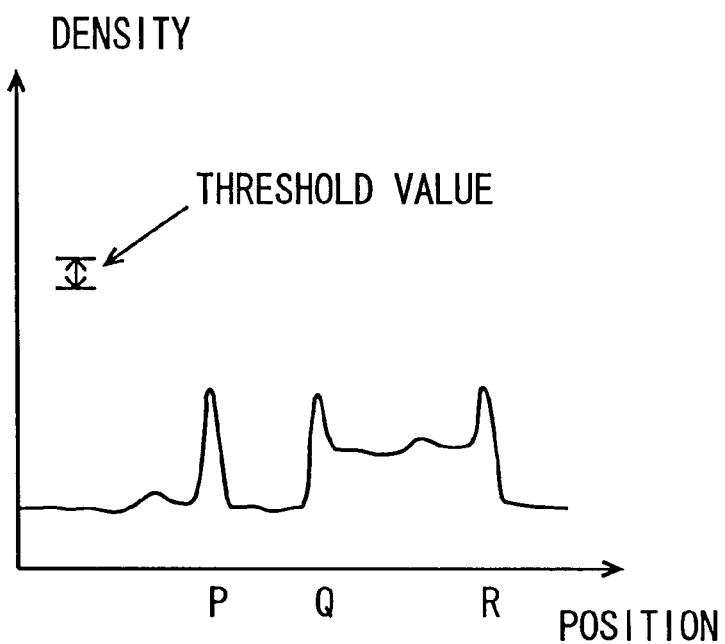
FIG. 10 shows the cross section density at straight line m of the line copy region of FIG. 9.
Figure 11:
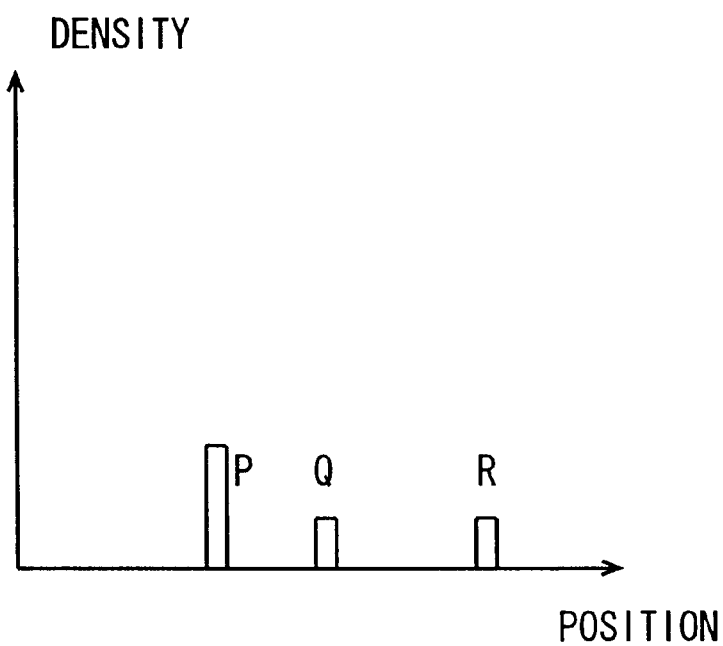
FIG. 11 shows the edge extracted based on the cross section density of FIG. 10.
Figure 12:
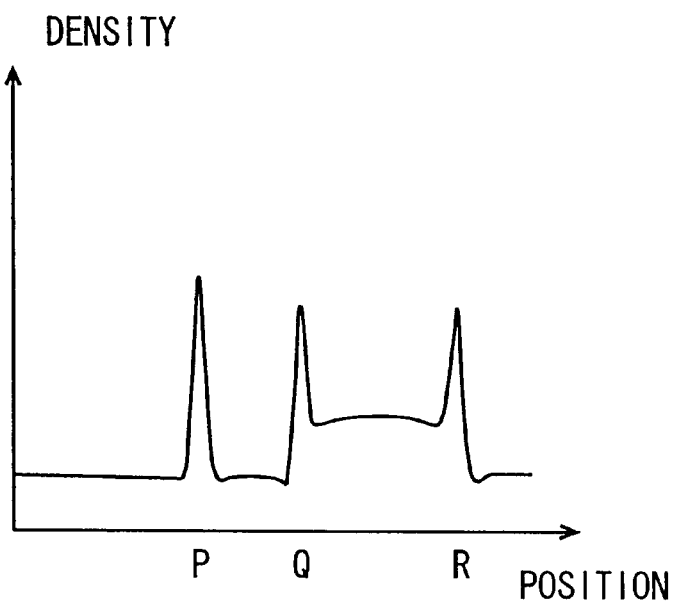
FIG. 12 shows the cross section density along straight line m when an edge enhancement process is applied on the edge region and a smoothing process is applied on all the regions other than the edge region.

FIG. 10 shows the cross section density along straight line m of the line copy region of FIG. 9. Referring to FIG. 10, the cross section density exhibits mountains at the positions of P, Q and R. The density difference between the peak and the foot of these mountains is greater than the threshold value. FIG. 11 shows edges extracted based on the cross section density of FIG. 10. Referring to FIG. 11, edges are extracted at respective positions P, Q and R. FIG. 12 shows the cross section density along straight line m of the region having the edge portion subjected to an edge enhancement process and the other areas subjected to a smoothing process. As such, the quality of the image can be improved by an edge enhancement process and smoothing process by employing an appropriate threshold value in edge extraction.

Figure 13:
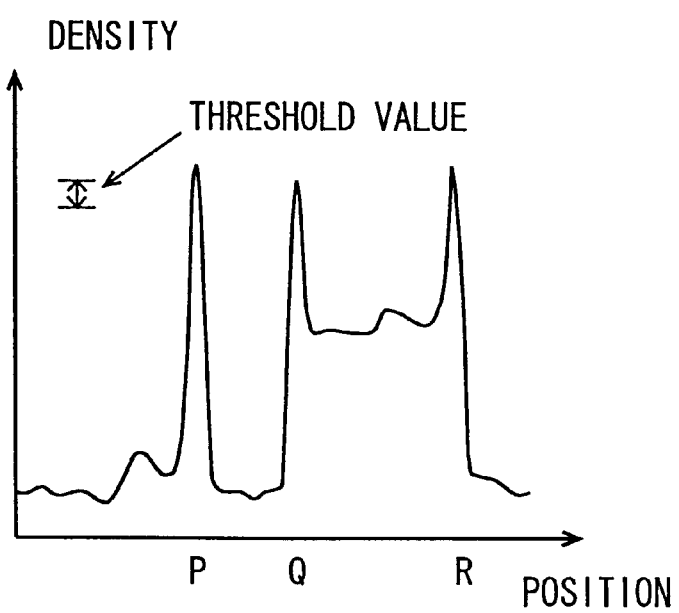

FIG. 13 shows the cross section density along straight line m of a line copy region corresponding to the case where the contrast changes due to the effect of the print density, illumination level, or the like. Referring to FIG. 13, there are a plurality of mountains with high density. A mountain whose density difference between the peak and the foot is greater than the threshold value is present in addition to those corresponding to positions P, Q and R.

Figure 14:
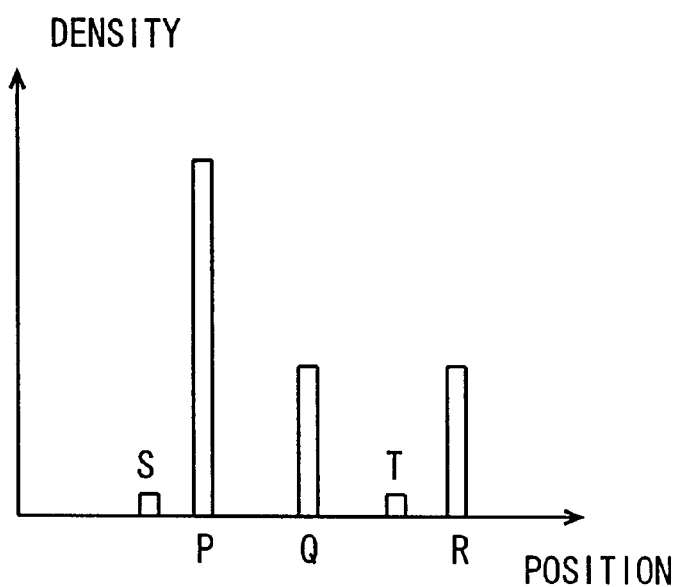
FIG. 14 shows an edge extracted from the cross section density of the FIG. 13.

FIG. 14 shows edges extracted from the cross section density of FIG. 13. Referring to FIG. 14, edges are extracted at the two positions S and T in addition to positions P, Q and R. The edges extracted at positions S and T arise from noise or the like.

Figure 15:
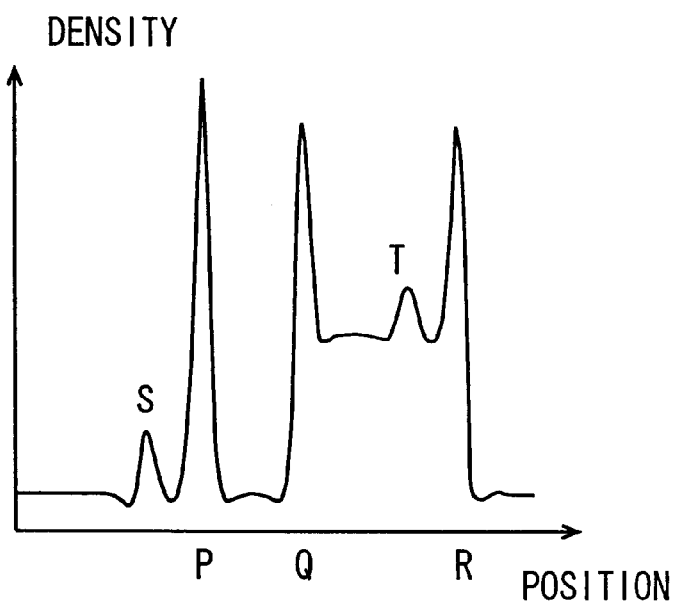
FIG. 15 shows the cross section density along straight line m when an edge enhancement process is applied on the edge portion of the line copy region altered in contrast and a smoothing process is applied on the region other than the edge.

FIG. 15 shows the cross section density along straight line m of a contrast-altered line copy region having the edge portion subjected to an edge enhancement process and the other areas subjected to a smoothing process. Referring to FIG. 15, the noise is enhanced at the portions of positions S and T.

Digital camera 1 of the present embodiment is directed to avoid erroneous extraction of an edge even in the case the contrast is altered due to affect of print density or illumination level by dynamically altering the threshold value employed in edge extraction according to the change in contrast.

The principle of dynamically altering the threshold value with digital camera 1 of the present invention will be described here. In digital camera 1 of the present embodiment, the threshold value is altered taking into advantage variation in the background pixel value. The background of a document image is a region independent of the density of the photograph region or text included in the document image. This background of the document image can be thought of a region under influence of the document image pickup condition such as the brightness level of illumination. By taking advantage of the background of the document image in the foregoing image processes and pixel value correction, the influence in the brightness of the illumination during image pickup, difference in sheet quality, or the like can be accommodated. Here, the document image background is the region excluding the text, photograph, line copy and dot region from the document image, and the region excluding characters from the text region. It is difficult to detect the document image background from a document image mixed with regions of a plurality of image attributes.

Figure 16:
FIG. 16 shows an example of a document image obtained by shooting with the digital camera.

FIG. 16 shows an example of a document image obtained by shooting with digital camera 1. Referring to FIG. 16, the document image includes a text region where characters appear, a photograph region at the right upper area where a photograph of a figure appears, and a photograph region at the middle bottom area where a photograph of a personal computer appears.

Figure 17:
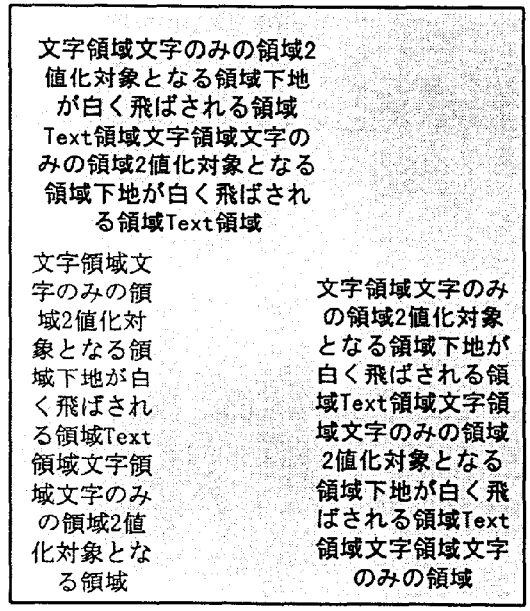
FIG. 17 shows an image removed with a non-text region from the document image of FIG. 16.
Figure 18:
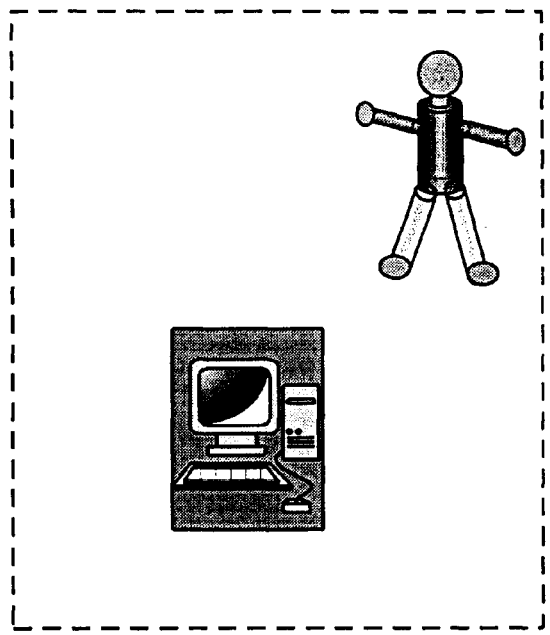
FIG. 18 shows the non-text region of the document image of FIG. 16.
Figure 19:
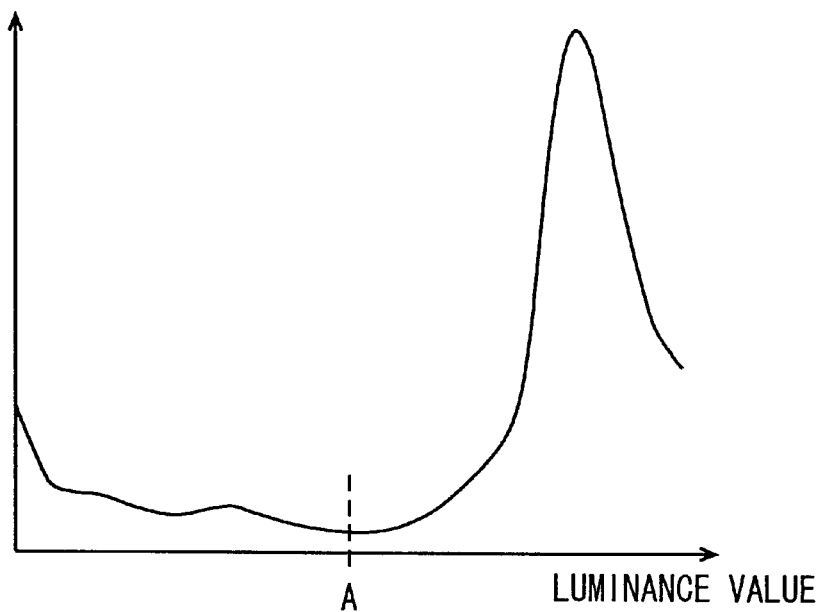
FIGS. 19, 20 and 21 show the distribution histogram of the luminance value of the document image shown in FIGS. 17, 18 and 16, respectively.
Figure 20:
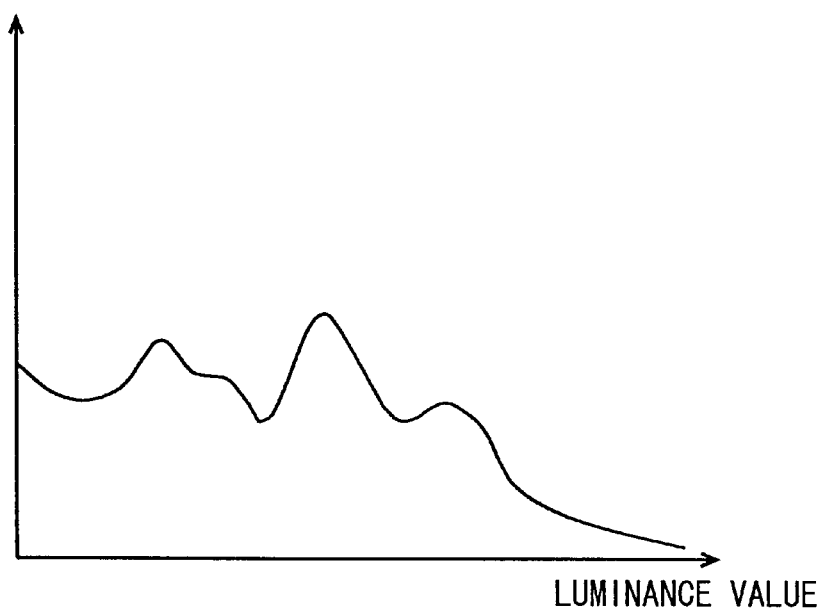
Figure 21:
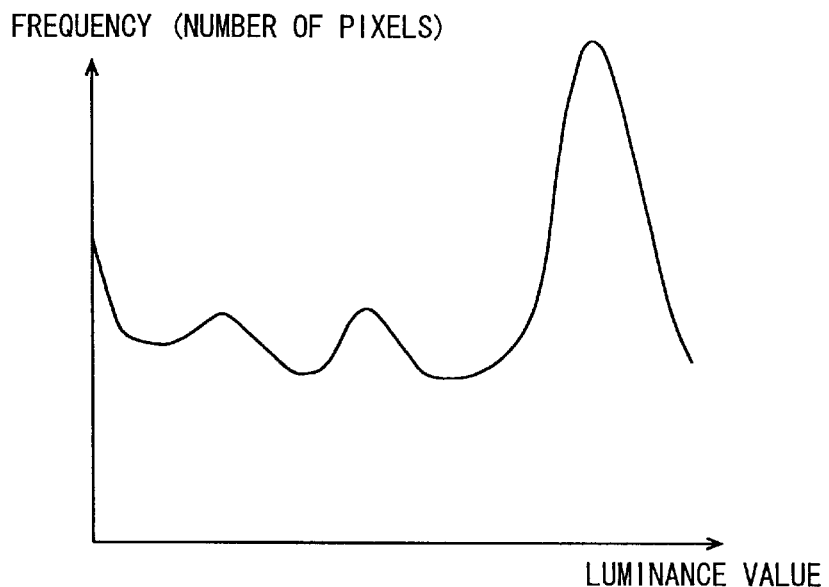

FIG. 17 shows an image having the non-text region removed from the document image of FIG. 16. FIG. 18 shows the non-text region out of the document image of FIG. 16. FIG. 19 shows a distribution histogram of the luminance values of the image of FIG. 17. FIG. 20 shows a distribution histogram of the luminance values of the image of FIG. 18. FIG. 21 shows a distribution histogram of the luminance values of the document image of FIG. 16.

Referring to FIG. 19, luminance value A at the foot of the mountain of the histogram can be easily detected since the mountain of the histogram is biased at the area where the luminance value is high. Using the obtained luminance value A as a threshold value, the text region can be binarized into the background and the text. FIG. 20 exhibits a plurality of histogram mountains. When there are many pixels along the entire luminance values, a luminance value that can be taken as a threshold value cannot be determined. The same applies for the case of FIG. 21. This is due to the influence of the histogram of FIG. 20.

Although the background can be easily detected from an image excluding the non-text region from a document image, it is difficult to detect the background from an image including a non-text region.

The image process carried out by digital camera 1 of the present embodiment will be described hereinafter with reference to the flow chart of FIG. 22. The image process includes a region determination process (S01) to determine a text region and a non-text region from a document image (S01), (S01), a process of binarizing the text region (S02), a threshold value calculation process taking advantage of a background feature amount to calculate a threshold value based on the feature amount calculated according to the pixel value of the background of the text region (S03), and a pixel value correction process of a non-text region to correct the pixel values in the non-text region based on the calculated threshold value (S04).

The region determination process will be described hereinafter with reference to the flow chart of FIG. 23 carried out at step S01 of FIG. 22. First, the chroma saturation and value of color are calculated for each pixel of the document image. When the document image is constituted by RGB data, value of color V is calculated by equation (1) and chroma saturation S is calculated by equation (2).

Value of color $V=(R+G+B)/3$ (1)

Chroma saturation $S=255\times \max(G+B-2R, B+R-2G, R+G-(R+B+G)$ (2)

At step S12, the document image is divided into a plurality of blocks. The divided blocks has the size of 3×3 or 4×4, for example. The block size is not limited to the aforementioned size. A larger or smaller block can be set. Also, the shape is not limited to a square, and may be a rectangle or a polygon.

As the block of interest, the first block is set (S13). At step S14, determination is made whether the block of interest is the last block or not. When the block of interest is the last block, control proceeds to step S15. When the block is not the last block, the process of steps S16 and et seq. is carried out for the block of interest.

At step S16, determination is made whether the average of the chroma saturation of the pixels in the block is high or not. When the average chroma saturation in the block is high, control proceeds to step S17, otherwise to step S18.

At step S18, determination is made whether the difference between the largest value and the smallest value of the value of color in the block of interest is large or not. When the difference is large, control proceeds to step S19, otherwise to step S17.

At step S17, the block of interest is set as a non-text block. At step S19, the block of interest is set as a text block. Here, a text block refers to a block including a text region whereas a non-text block refers to a block that does not include a text region.

At step S20, determination is made whether there is another block to be taken as the block of interest. When there is another block, that block is set as the block of interest. Control proceeds to step S14.

When the block of interest is the last block (YES at S14), the adjacent block is integrated to form a rectangle (S15). In the case where an adjacent text block is integrated to form a rectangle, the resultant rectangular region becomes a text region. In the case where an adjacent non-text block is integrated to form a rectangle, that region becomes a non-text region other than the text region such as a photograph region, line copy region or a half tone dot region.

In the region determination process, a text region and a non-text region are extracted as rectangular regions from the document image.

In the above-described region determination process, determination of whether the average chroma saturation in the block is higher or not was made at step S16 and determination of whether the difference between the largest and smallest values of the value of color in the block is great or not was made at step S18. The threshold value used in the determination of steps S16 and 18 do not have to be high in accuracy. The threshold value required in recognizing a large object such as a text region can be lower in accuracy than that required in extracting a small object in an edge extraction process. There is no problem even if the threshold value used in the region determination process is not so high in accuracy.

Extraction of a text region can be carried out using the existing methods such as using the Max-Min value of the luminance for each block or isolated points. In the case where these methods are employed, the threshold value thereof does not have to be high in accuracy.

Figure 22:
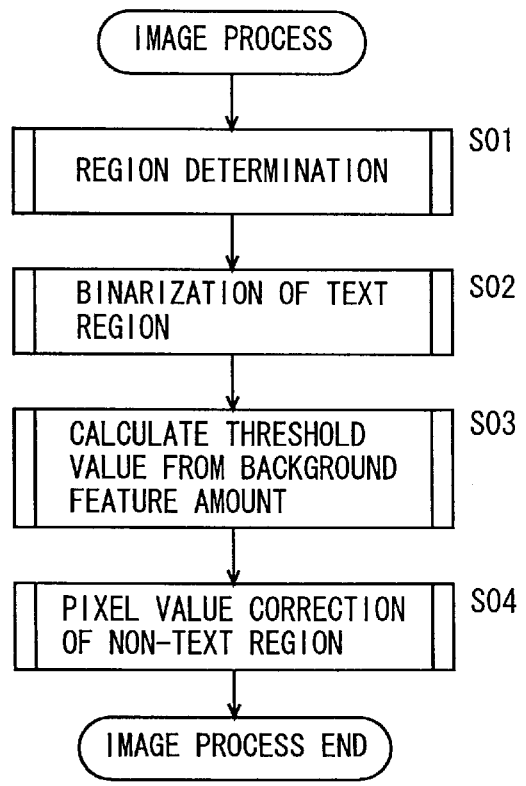
FIG. 22 is a flow chart of the image process carried out by digital camera of the first embodiment.
Figure 23:
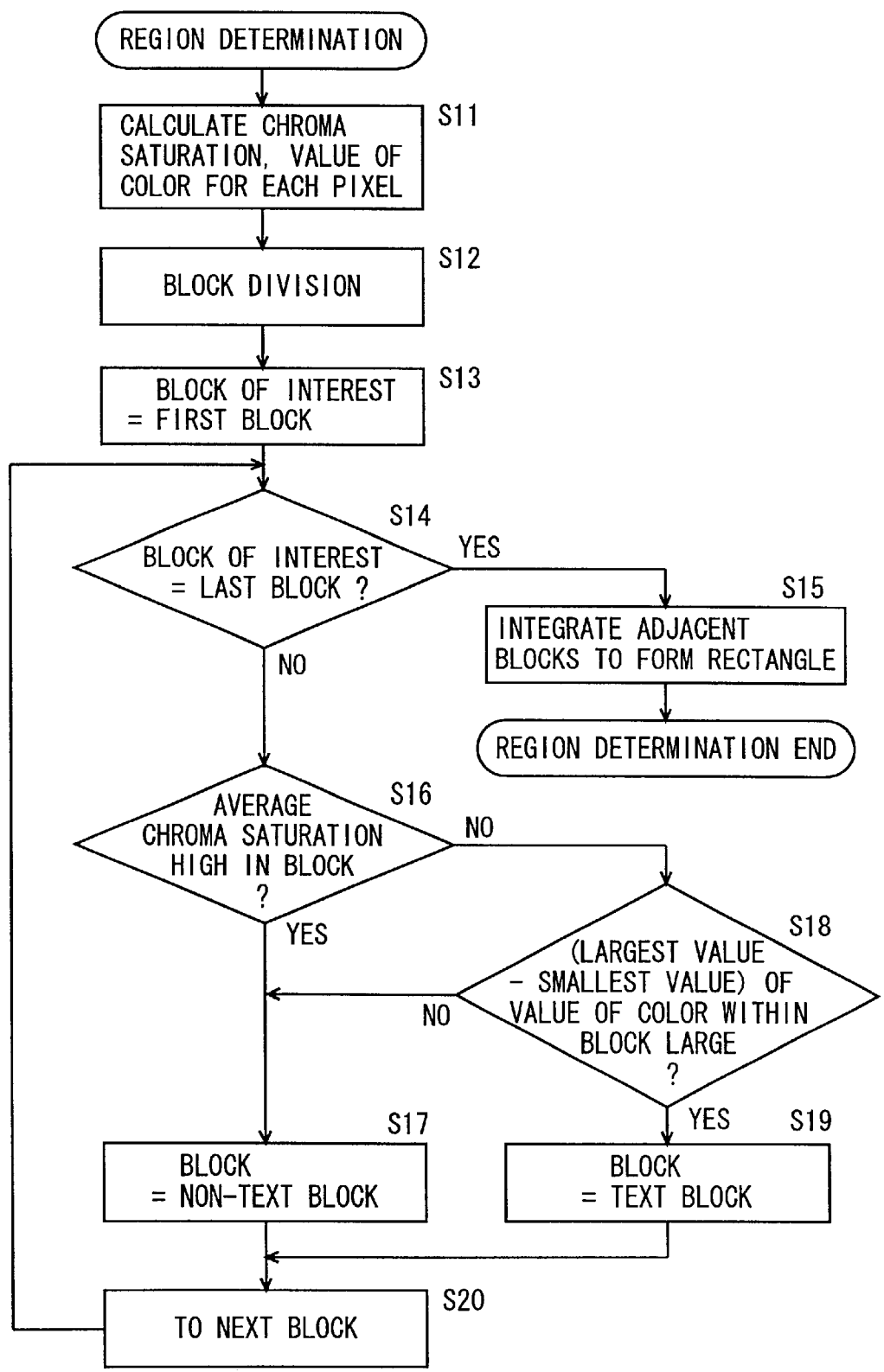
FIG. 23 is a flow chart of the region determination process carried out at step S01 of FIG. 22.
Figure 24:
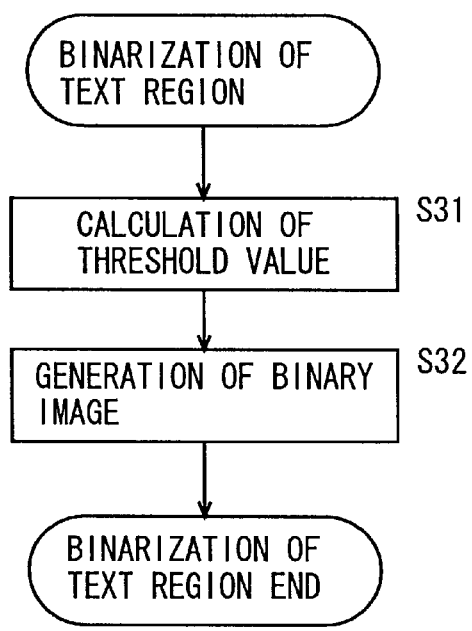
FIG. 24 is a flow chart of the binarization process on a text region carried out at step S02 of FIG. 22.

FIG. 24 is a flow chart of the binarization process on a text region carried out at step S02 of FIG. 22. Referring to FIG. 24, the threshold value used for binarization is calculated from the distribution histogram of the luminance values of the pixels included in the text region with respect to the text region extracted in the region determination process (S31). The distribution histogram of the luminance value of pixels of a text region can have the foot easily detected since a mountain of high frequency is biased at the portion where the luminance value is high, as described before. Therefore, this threshold value can be easily obtained by calculation.

A binary image for the text region is generated using a threshold value obtained at step S31 (S32). By this binarization process, the no-print white pixels in the text region becomes the background. This group of pixels becomes the background in the text region.

Figure 25:
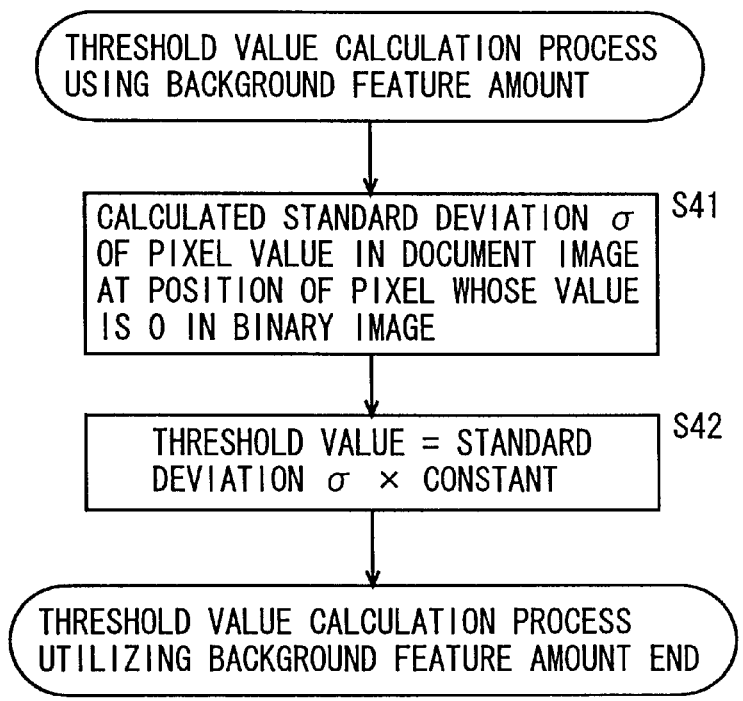
FIG. 25 is a flow chart of a threshold value calculation process taking advantage of the background feature amount carried out at step S03 of FIG. 22.

FIG. 25 is a flow chart of the threshold value calculation process utilizing the background feature amount carried out at step S03 of FIG. 22. At step S41, the standard deviation σ of the pixel values in the document image corresponding to the pixels with the value of 0 (no-print white pixel) is calculated. In other words, the standard deviation of the pixel values included in the background within the text region of the document image is calculated. At step S42, the obtained standard deviation σ is multiplied by a predetermined constant K, which is taken as the threshold value.

This obtained threshold value is used in correcting the pixel values in the non-text region. At that stage, the threshold value can be modified by the pixel value correction carried out with respect to the non-text region. For example, the value of constant K is altered depending on the processing contents such as edge extraction, color distance comparison or scaling in pattern matching. Although standard deviation is employed in the present embodiment, a threshold value obtained from the variance or average of the pixel values included in the background region can be used depending upon the nature of process.

In the present embodiment, standard deviation σ is calculated using the pixel values of all pixels included in the background within the text region of the document image. In the case where the contrast is uneven due to shading or the like in the document image, standard deviation can be calculated using only the pixel values of pixels in the area of the background within the text region in the neighborhood of the photograph region, line copy region, and half tone dot region that is the object of correction. This provides the advantage of reducing the effect of unevenness in contrast due to shading or the like. Here, the neighborhood of the region that is the object of correction refers to the background area in the text region that is within a predetermined distance from the photograph region, line copy region and half tone dot region that is the object of correction.

In the present embodiment, the threshold value is calculated from the pixel values included in the background of the text region. The threshold value can be calculated from the pixel values included in the region excluding the text, photograph, line copy and half tone dot region from the document image as long as the region is the background of the document image.

Figure 26:
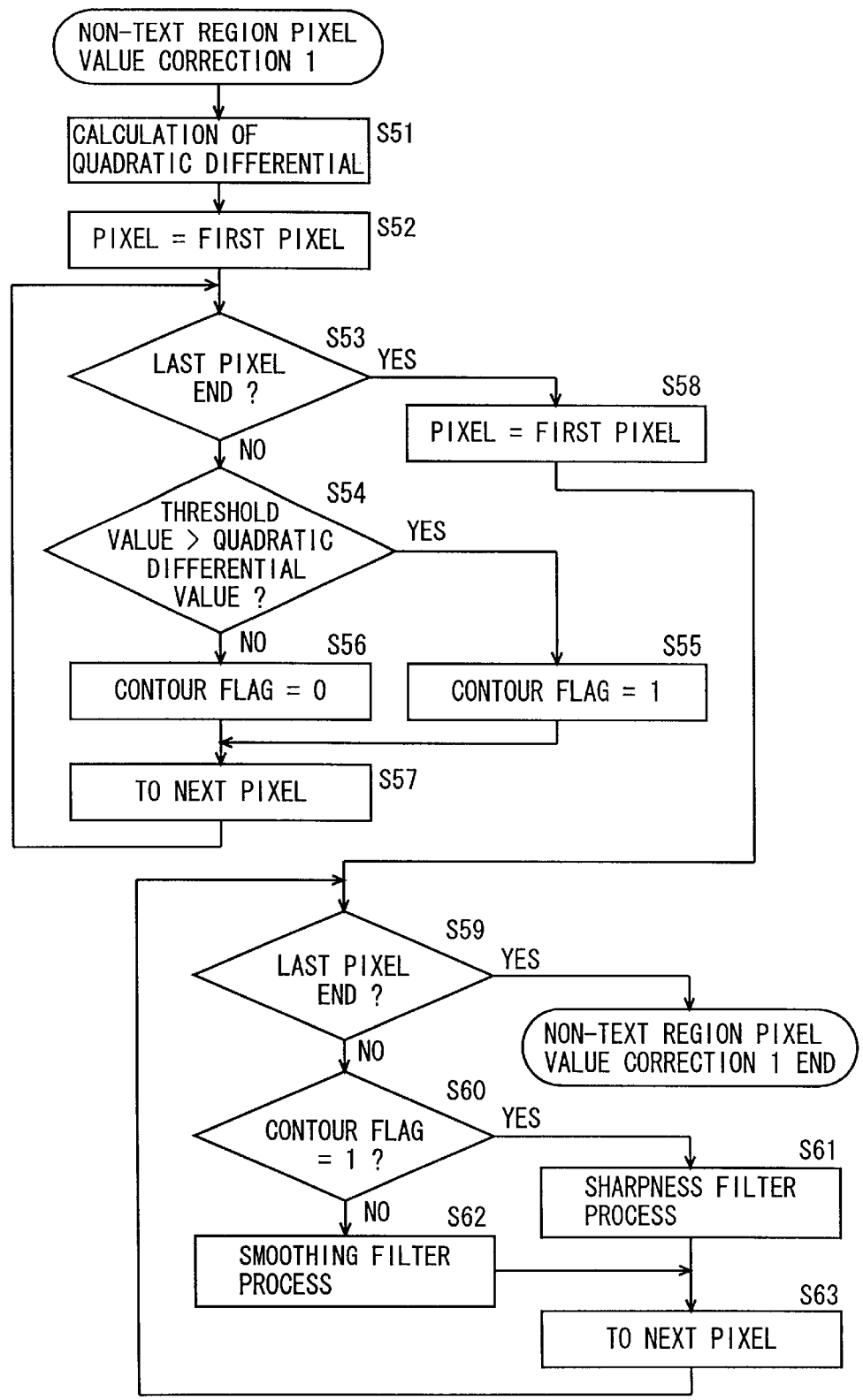
FIGS. 26 and 27 are first and second flow charts, respectively, of the pixel value correction process of a non-text region carried out at step S04 of FIG. 22.

Correcting pixel values in a non-text region will be described hereinafter with reference to the first flow chart of FIG. 26 carried out at step S04 of FIG. 22. At step S51, a quadratic differential process is carried out on the non-text region obtained by the region determination process. Here, a quadratic differential value is obtained with respective pixels by using a predetermined quadratic differential filter.

The first pixel subjected to quadratic differential is selected (S52). At step S53, determination is made whether the selected pixel is the last pixel or not. When the selected pixel is the last pixel, control proceeds to step S58, otherwise to step S54.

At step S54, determination is made whether the quadratic differential value of the selected pixel is smaller than the threshold value. When the quadratic differential value is smaller than the threshold value (YES at S54), the contour flag is set to "1" (S55). When the quadratic differential value is not smaller than the threshold value (NO at S54), the contour flag is set to "0" (S56). Then, the next pixel is set as the pixel of interest in the process (S57), and control proceeds to step S53.

When the process of steps S54–S57 is applied on all the pixels (YES at S53), the contour flag of the first pixel is set to the pixel of interest in the process (S58). In the process subsequent to step S58, the process applied to the document image is altered depending upon whether the contour flag is 1 or 0.

At step S59, determination is made whether the process has been carried out until the last pixel. When the process has ended, the pixel value correction process of a non-text region is completed. When the process has not yet ended, determination is made whether the contour flag of the pixel of interest is 1 or not (S60). When the contour flag is 1, a sharpness filter process is applied on the pixels in the document image corresponding to the position of that pixel (S61).

When the contour flag is not 1 (no at S60), a smoothing filter process is applied on the pixel in the document image corresponding to that pixel (S62). At step S63, that pixel is set as the pixel of interest. Then, control proceeds to step S59.

In the pixel value correction process of a non-text region, the contour flag is set to 1 for the edge pixel of the non-text region whereas the contour flag is set to 0 for a pixel not corresponding to the edge. A sharpness filter process is applied on pixels whose contour flag is 1 to emphasize the edge portion. Pixels whose contour flag is not 0 are subjected to a smoothing filter process. Correction is made to obtain a smooth image.

The threshold value employed in determining whether the contour flag is to be set to 1 or not at step S54 corresponds to the threshold value obtained by the threshold value calculation process taking advantage of the background feature amount shown in FIG. 25. Therefore, edge extraction is effected taking into consideration difference in the sheet quality, image pickup condition, and the like.

[Modification of Pixel Value Correction Process of Non-text Region]

Figure 27:
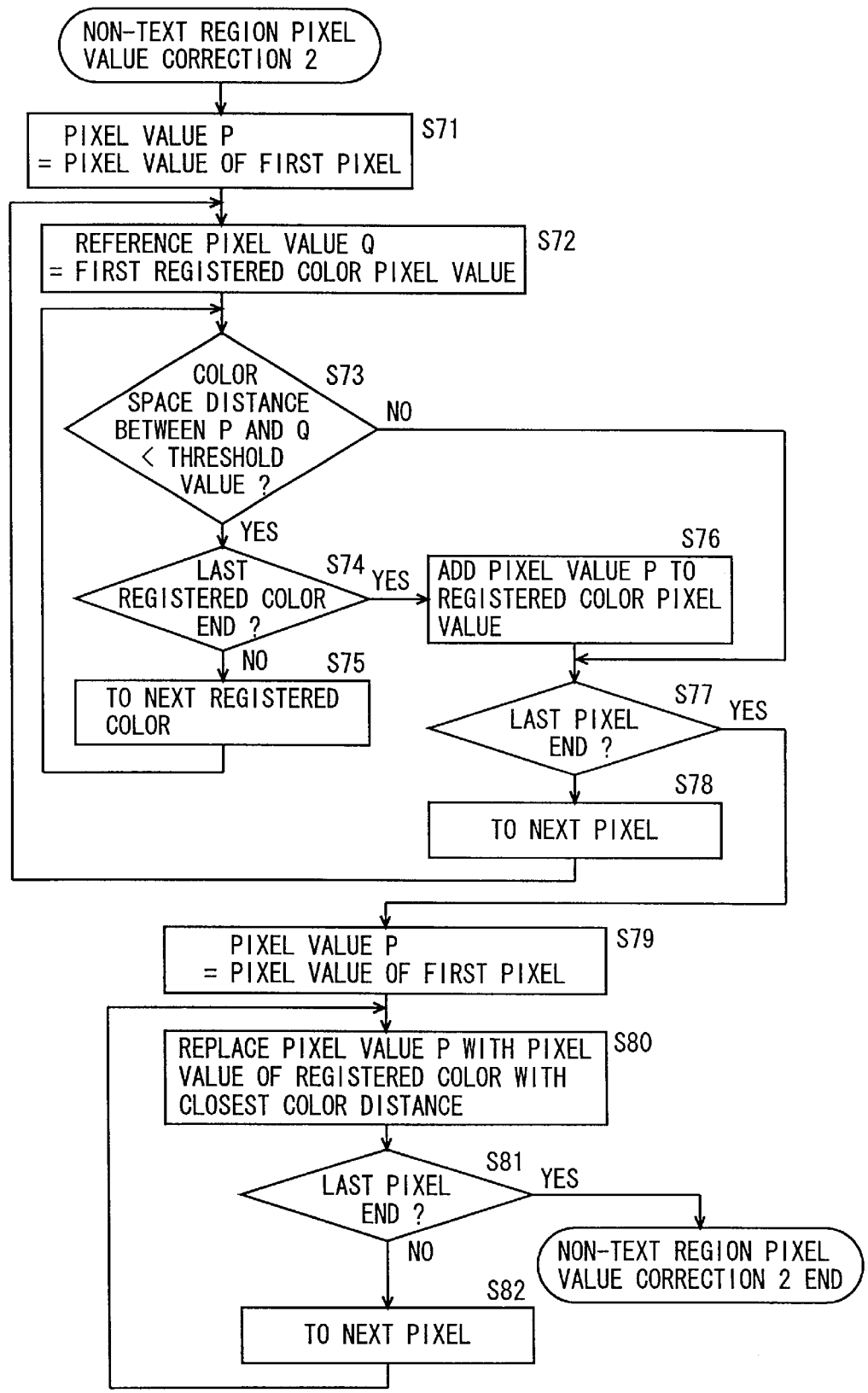

Modification of the pixel value correction process of a non-text region will be described with reference to the second flow chart of FIG. 27 carried out at step S04 of FIG. 22. The present modification is directed to apply a subtractive color process on the non-text region.

At step S71, the pixel value of the first pixel is set in pixel value P. At step S27, the first registered color pixel value is set in reference pixel value Q. The registered color pixel value refers to the pixel value whose color is registered. It is to be noted that 0 is set in reference pixel value Q at the first time since there is no registered color pixel value initially.

At step S73, determination is made whether the color space distance between pixel value P and reference pixel value Q is larger than the threshold value. When the distance is larger than the threshold value, control proceeds to step S74, otherwise to step S77.

At step S74, determination is made whether the registered color pixel value set in reference pixel value Q is the last one or not. More specifically, reference pixel value Q is sequentially modified to the next registered color pixel value at step S75 following the first setting of the registered color pixel value at step S72, and determination is made whether reference pixel value Q has been set or not up to the last registered color pixel value at step S74. Accordingly, pixel value P can be compared with all the registered color pixel values.

When the registered color pixel value set in reference pixel value Q is the last one (YES at S74), pixel value P is newly applied to the registered color pixel value (S76). Pixel value P is registered when a pixel value having a color space distance from pixel value P greater than the threshold value is not yet registered in the registered color pixel values.

At step S77, determination is made whether the pixel set in pixel value P is the last pixel or not. When the pixel value set in pixel value P is the last pixel, control proceeds to step S79, otherwise to step S78. At step S78, the pixel value of next pixel is set in pixel value P, and control proceeds to step S72.

When the pixel set in pixel value P is the last pixel (YES at S77), the pixel value of the first pixel is set in pixel value P (S79). Then, pixel value P is replaced with a pixel value of a registered color pixel value whose color space distance is closest (S80).

Determination is made whether step S80 has been carried out until the last pixel (S81). When the process has been completed up to the last pixel, the pixel value correction process of the non-text region is terminated. When there is still a pixel to be processed, the next pixel is set in pixel value P at step S82, and control proceeds to step S80.

In the foregoing modification of the pixel value correction process of a non-text region, the threshold value used at step S73 corresponds to a threshold value obtained by the threshold value calculation process taking into consideration the background feature amount. Therefore, the threshold value varies according to difference in the sheet quality, image pickup condition, and the like. Thus, a subtractive color process corresponding to difference in the sheet quality and image pickup condition can be carried out.

Second Embodiment

When a document is shot using a digital camera, the shade and coloring of the obtained document image differ depending upon the document and image pickup condition since the shooting distance and illumination condition are not constant.

Referring to FIG. 16, the document image obtained often has a grey, not white, background depending upon the illumination during shooting, reflectance of the document, or the like. The background of the document image can be rendered white by altering the shutter speed or the CCD integration time of the digital camera. However, the area having the same brightness level in the non-text region will also be rendered no-print white, resulting in picture quality degradation. Furthermore, the information required for region determination and image correction of the non-text region will become insufficient due to the region having the same brightness level in the non-text region rendered no-print white.

When the text is idealistically the binary values of white and black, the picture quality is favorable. The compression rate can be improved in the compression process, and further preferable in character recognition. Therefore, the text region is often binarized when the background of the document image is not white.

In contrast, a binarization process should not be applied from the standpoint of picture quality for a non-text region, particularly a non-text region with color tone. Since it is extremely difficult to detect the background based on the information of a non-text region alone, the no-print white technique is not generally effected for a non-text region.

Figure 28:
FIG. 28 shows an image corresponding to a binarization process applied on the text region of the document image of FIG. 16.

FIG. 28 shows a document image having the text region of the document image of FIG. 16 subjected to binarization. It is appreciated from FIG. 28 that a border that was originally not present appears between the background of the non-text region and the background of the text region that is binarized and rendered no-print white, resulting in noticeable boundary.

In general, image compression such as JPEG is carried out on a rectangle-by-rectangle basis. Therefore, the region determination of identifying a photograph region or the like is often carried out in units of rectangles. In the case where the non-text region is arranged in a complicated form in the document image, the background of a text region may be included within the rectangle of the non-text region extracted by the region determination. The background of the non-text region will not be uniform, so that the compression rate cannot be improved. It is therefore necessary to render the border between the background of the text region and the background of the non-text region unnoticeable.

In order to render the border unnoticeable, an approach of setting pixels lower than a predetermined density value as the background region instead of extracting the background from the non-text region can be considered. However, it is not possible to set only the background of the non-text region as no-print white, so that the picture quality will be degraded. Even if the background can be determined from the non-text region, those of the non-text region that are not completely white in the background will be considered to be caused by the effect of the illumination condition and sheet color. If a process is carried out to remove this effect only on the background region within the non-text region, the relative pixel value change between the pixel of the background in the non-text region and the pixel not corresponding to the background will become so great that an awkward semblance is given to the viewer. The picture quality will not be satisfactory. These problems will be encountered also in the case where the paper sheet itself is slightly colored such as a newspaper sheet.

In the digital camera of the second embodiment, an image process is to be carried out rendering unnoticeable the neighborhood of the boundary between the background of a text region subjected to a binarization process and the background included in a photograph region or the like adjacent to the text region.

Figure 29:
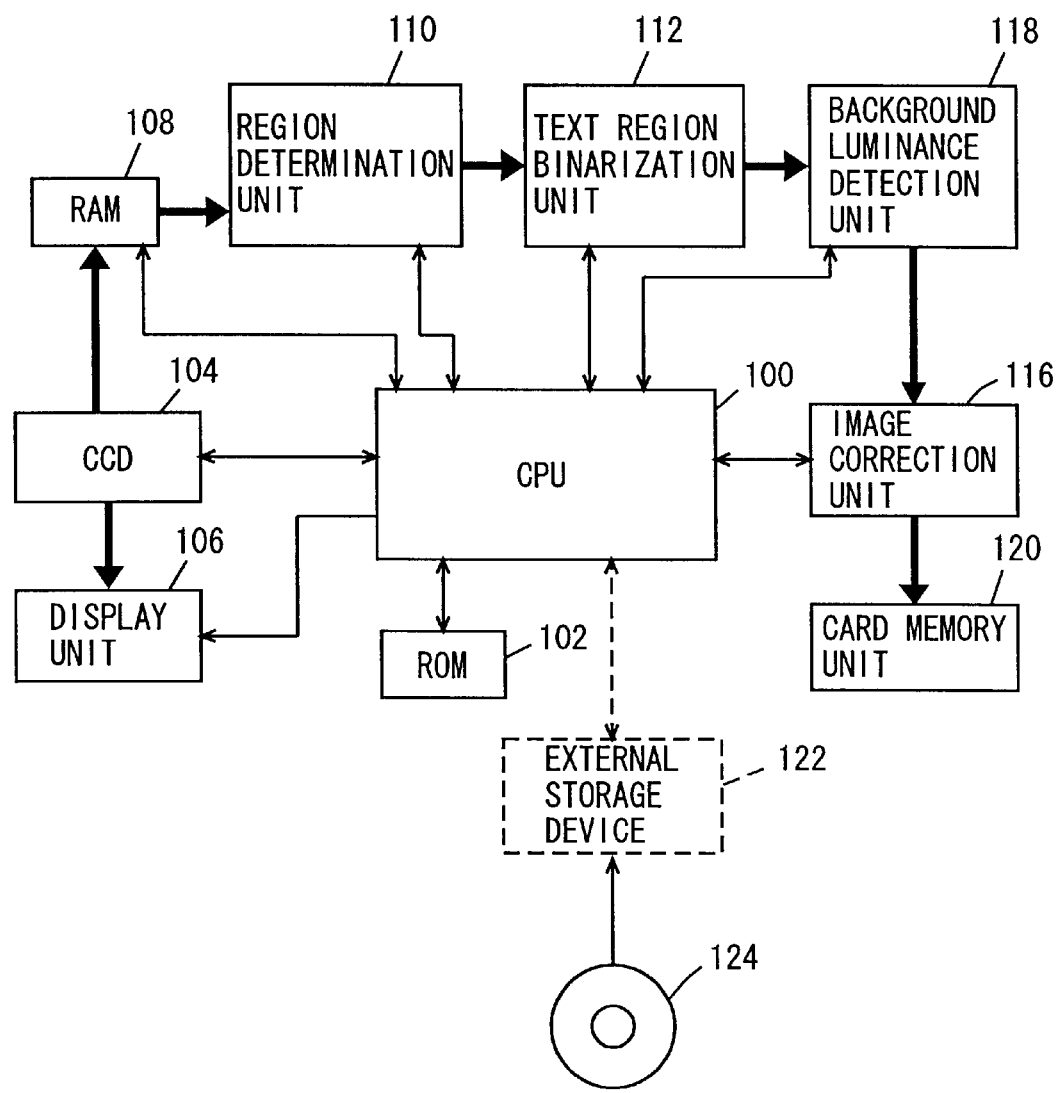
FIG. 29 is a block diagram showing a circuit structure of a digital camera according to a second embodiment of the present invention.

FIG. 29 is a block diagram showing a circuit structure of a digital camera 1 according to a second embodiment of the present invention. Digital camera 1 of the second embodiment has threshold value calculation unit 114 of digital camera 1 of the first embodiment replaced with a background luminance detection unit 118. Components corresponding to those of digital camera 1 of the first embodiment will not be repeated here.

Background luminance detection unit 118 detects the background luminance value based on the pixel value of the background in the text region binarized at text region binarization unit 112.

Figure 30:
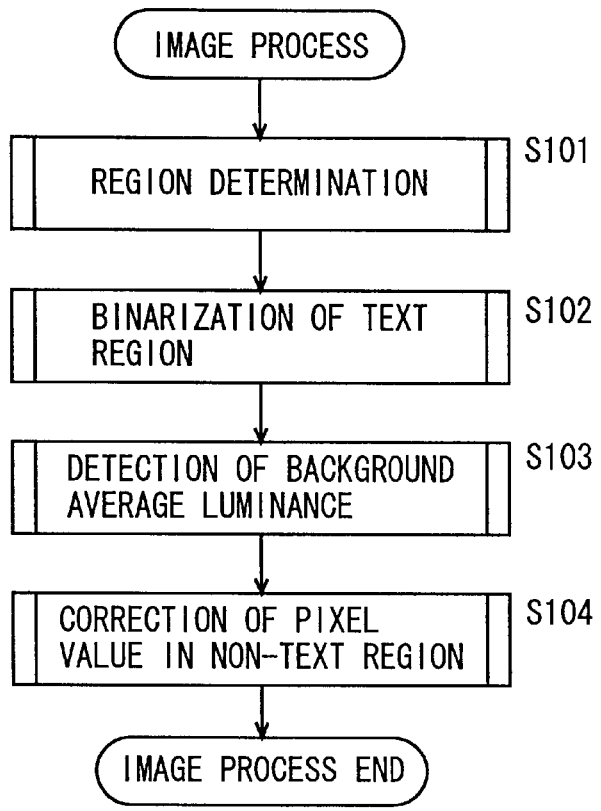
FIG. 30 is a flow chart of the image process carried out by the digital camera of the second embodiment.

The image process carried out by digital camera 1 of the second embodiment will be described hereinafter with reference to the flow chart of FIG. 30. The image process of the second embodiment includes a step S101 of carrying out region determination, a step S102 of carrying out a binarization process on a text region, a step S103 of detecting the average luminance of the background, and a step S104 of correcting the pixel value of a non-text region.

The region determination process of step S101 and the text region binarization process of step S102 are identical to those carried out by the digital camera of the first embodiment. Therefore, description thereof will not be repeated.

Figure 31:
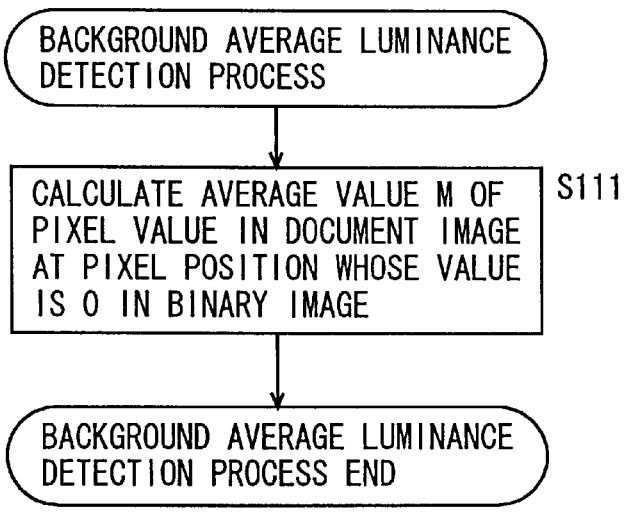
FIG. 31 is a flow chart of the background average luminance detection process carried out at step S103 of FIG. 30.

The background average luminance detection process will be described hereinafter with reference to the flow chart of FIG. 31 carried out at step S103 of FIG. 30. At step S111, an average value M of the pixel values of the document image corresponding to the position of pixels whose pixel value is 0 out of the binary image generated at the binarization process of a text region is calculated. Accordingly, the average of the pixel values in the background of the text region in the document image is obtained. The average value M obtained here includes average values Mr, Mg and Mb of respective components with respect to pixel values R, G and B.

Figure 32:
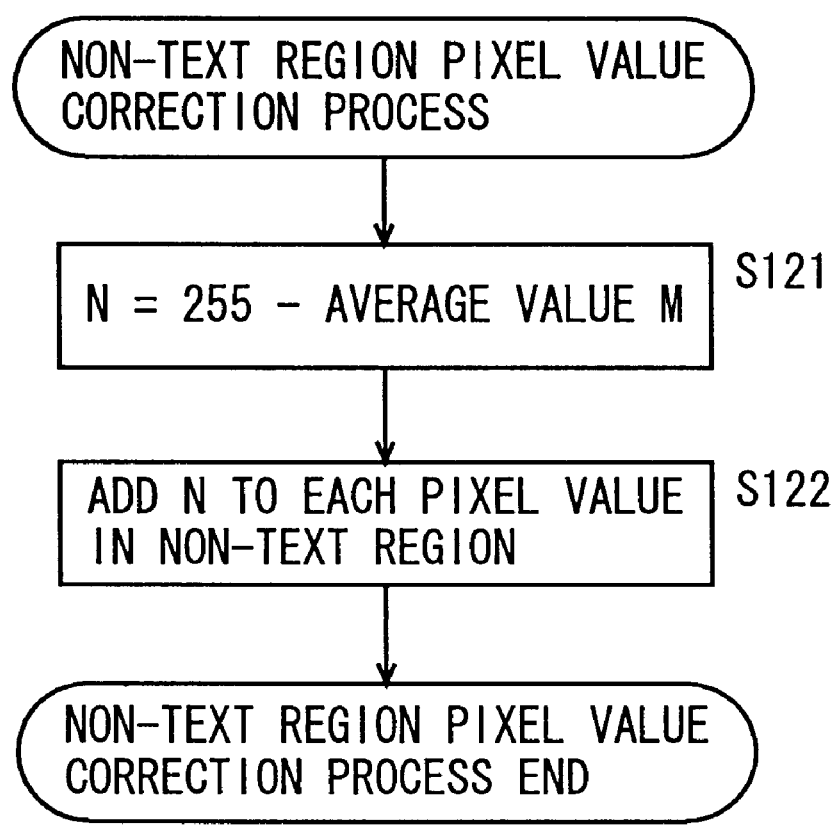
FIG. 32 is a flow chart of the pixel value correction process of a non-text region carried out at step S104 of FIG. 29.

FIG. 32 is a flow chart of the pixel value correction process of a non-text region carried out at step S104 of FIG. 29. At step S121, the value of subtracting average value M obtained at the background average luminance value detection process from value 255 is set as variable N. Here, variable N includes Nr, Ng and Nb corresponding to R, G and B. Respective values are calculated by the following equations.

$Nr=255-Mr$ $Ng=255-Mg$ $Nb=255-Mb$

At step S122, variable N is added to respective pixel values for all the pixels included in the non-text region. Accordingly, the non-text region is corrected.

Figure 33:
FIG. 33 shows an image corresponding to an image process of the second embodiment applied on the document image of FIG. 19.

FIG. 33 shows an image of the document image of FIG. 16 subjected to the image process of the second embodiment. Comparing FIGS. 28 and 33, it is appreciated that the border between the background of the text region and the background of the photograph region of a figure is more unnoticeable in FIG. 33.

Although the present embodiment is described in which correction is carried out in the RGB color space, the correction can be carried out likewise in a color space other than the RGB color space. Also, correction can be carried out even with a monochrome image.

Instead of the simple correction of adding the value of variable N to the pixel value, complicated γ correction can be effected as long as conversion is carried out where average value M is converted into a pixel value representing white.

In the background average luminance value detection process, average value M of the pixel value of pixels included in the background of the text region is used. An intermediate value or most frequent value can be used instead of the average value. Furthermore, another feature amount such as standard deviation can be employed in carrying out a more complicated correction.

In the case where the document image includes unevenness such as shading, the average value is to be calculated using only the pixel values of pixels included in the neighborhood region of the non-text region such as the photograph region or half tone dot region that is the object of correction out of the background of the text region instead of using the average value of all the pixels in the background of the text region. Accordingly, the non-text region can be corrected with the effect of unevenness such as shading appearing in the document image reduced.

In digital camera 1 of the present embodiment, the non-text region is corrected based on the average of the pixel values included in the background of the text region. Therefore, the non-text region can be corrected accommodating change in the illumination condition, paper sheet quality and the like, so that the border between the text region and the photograph region can be made unnoticeable.

Digital camera 1 of the first and second embodiments are characterized in applying a process according to the region type. Attention is focused on the presence of effective information (background information) in another region (text region), and the performance of image processing is improved using such information.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:

a reception unit receiving image data, an extraction unit to extract a first region from said received image data, a calculation unit to calculate a background amount of said extracted first region, and a correction unit to correct a second region of said image data according to said calculated background amount.

2. The image processing apparatus according to claim 1, wherein said correction unit corrects image data included in said second region so as to remove an amount corresponding to said calculated amount from an image of said second region.

3. The image processing apparatus according to claim 1, wherein said calculation unit calculates a background amount of an area in said first region located close to said second region.

4. The image processing apparatus according to claim 1, wherein said calculation unit calculates a background amount according to standard deviation or average of image data corresponding to the background of said second region.

5. The image processing apparatus according to claim 1, wherein said first region includes a text image region.

6. The image processing apparatus according to claim 5, wherein said second region includes a photograph image region.

7. The image processing apparatus according to claim 5, wherein said second region includes a line copy image region.

8. The image processing apparatus according to claim 1, wherein said correction unit comprises a threshold value calculation unit to calculate a threshold value according to said calculated background amount, and an edge detection unit obtaining an edge of the second region in said received image data according to said calculated threshold value.

9. The image processing apparatus according to claim 8, wherein said first region includes a text image region, and said second region includes a line copy image region.

10. The image processing apparatus according to claim 1, wherein said correction unit includes a threshold value calculation unit calculating a threshold of color distance according to said calculated background amount, and a subtractive color processing unit subtracting color of said second region in said received image data according to said calculated threshold value of color distance.

11. The image processing apparatus according to claim 10, wherein said first region includes a text image region, and said second region includes a line copy image region.

12. An image processing method comprising the steps of:

receiving image data, extracting a first region from said received image data, calculating a background amount of said extracted first region, and correcting a second region of said image data according to said calculated background amount.

13. A computer-readable recording medium recorded with an image processing program for a computer to execute the steps of:

receiving image data, extracting a first region from said received image data, calculating a background amount of said extracted first region, and correcting a second region of said image data according to said calculated background amount.

* * * * *